May 27, 1958
F. C. McCOY
2,836,368
PULVERIZING METHOD AND APPARATUS
Filed June 25, 1954
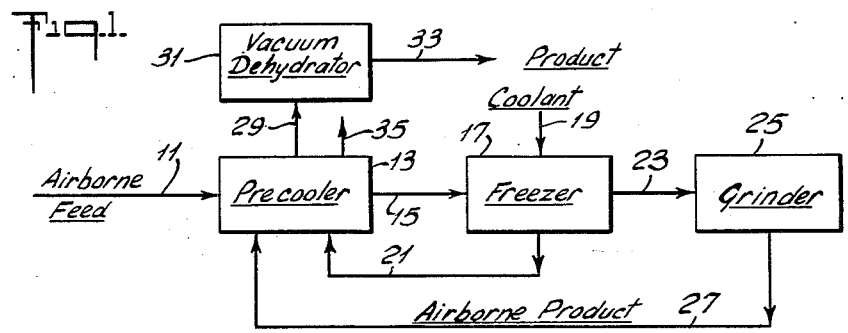
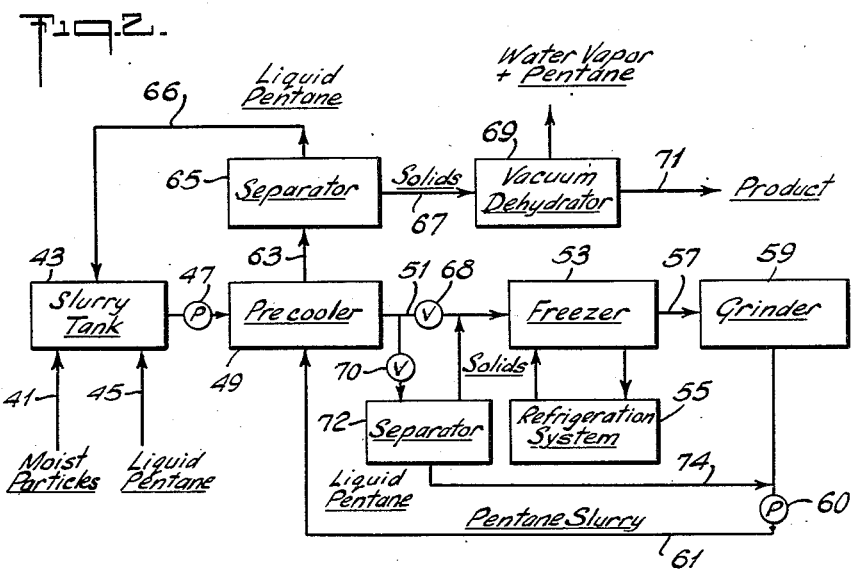
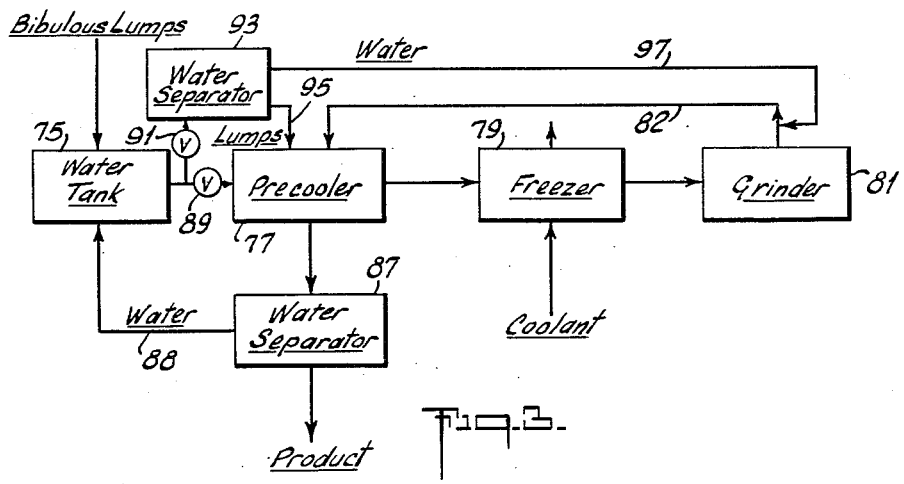

United States Patent Office 2,836,368
Patented May 27, 1958

2,836,368

PULVERIZING METHOD AND APPARATUS

Frederic C. McCoy, Beacon, N. Y., assignor to The Texas Company, New York, N. Y., a corporation of Delaware Application June 25, 1954, Serial No. 439,327

15 Claims. (Cl. 244—17)

The present invention relates to a novel method and apparatus for pulverizing normally soft substances containing a liquid such as water which is characterized by the property of freezing to a solid material such as ice. More particularly, the invention also concerns the drying of substances so pulverized.

Briefly, the invention involves preparing fine particles from relatively coarse particles of a substance which is impregnated with a freezable liquid, by first freezing the liquid content of the substance to a solid, thereafter pulverizing the brittle frozen coarse particles to form fine particles at a low temperature, and then passing the fine particles in heat exchange relationship with the coarse particles ahead of the freezing step to precool the coarse particles.

Among the substances which can be finely pulverized by my method are coarse particles of many foods containing natural water, such as potatoes, spinach, apples, fish, peas, and various meats. Other substances are coarse particles of such bibulous materials as sponge rubber, porous or spongy forms of cellulose, sawdust, tree bark, and foamed plastics such as polyvinylidene chloride, vinyl resins, styrene resins, and acrylate resins, all of which require artificial impregnation with a freezable liquid as by soaking in a pool to cause liquid to enter the pores of the substance.

After the frozen particles have been pulverized the content of water or other impregnating material is separated in any suitable way, as by melting and filtration, or by vacuum drying.

While the coarse particles can be passed through the freezing and pulverizing system in any suitable manner, I prefer to carry them suspended in either a gas such as air, or a liquid such as normal pentane which is immiscible with the freezable liquid and has a considerably lower freezing point.

For simplicity, in the following description the principles of the invention will be exemplified by the freezing of contained water to form ice in the particles to be pulverized. It is to be understood that other freezable liquids can also be used, such as tetrachloro difluoro ethane, 1-bromo-1-chloro ethane, benzene, cyclohexane, and 1,4-dioxane.

Also, air will be described as the carrying gas, although other gases such as propane, nitrogen, argon or butane may be used.

Similarly, where the particles are carried in slurry form by a liquid, pentane will be mentioned, although it is clear that other liquids can be used, such as higher paraffin hydrocarbons (e. g., normal hexane), halogenated compounds such as ethylene dichloride, cycloparaffins such as methyl cyclopentane, and other nonreactive relatively low boiling and low melting compounds. The liquid used for slurry formation should have a relatively low boiling point in order that it might be separated from the ground material by vacuum vaporization, except where the ground material is not affected by heating.

The principles of the invention will become more apparent from the following detailed description, having reference to the accompanying drawings, wherein:

Fig. 1 is a schematic flow diagram of apparatus for performing one modification of the invention, wherein the coarse particles are carried through the system by a gas;

Fig. 2 is a schematic flow diagram showing apparatus for performing a second embodiment of the invention wherein the coarse particles are suspended in a liquid for passage through the system; and Fig. 3 is a schematic flow diagram showing apparatus for performing a third embodiment of the method of the invention, wherein a water-free bibulous material is first impregnated with water before passage through the pulverizing system.

Referring to Fig. 1 a water-saturated substance to be pulverized is sliced, torn, or otherwise reduced to a coarse average particle size such as ⅛–¼ inch. The coarse particles are suspended in a flowing stream of a gas such as air by aspiration or another conventional manner, and are passed continuously through a conduit 11 into a precooler 13 wherein they are cooled to a low temperature above the freezing point of the occluded water, such as 10° C., in a manner to be described more in detail hereinafter.

From the precooler the airborne particles flow through a conduit 15 into a freezer 17 wherein the occluded water is frozen to ice at a temperature of about —30° C. by passing a suitable low temperature coolant through the freezer by way of an inlet conduit 19 and an outlet conduit 21. Spent coolant then flows through precooler 13 to precool the incoming particles. Suitable coolants are cold nitrogen gas or air evaporated from a liquid source, cold carbon dioxide gas evaporated from a solid block of carbon dioxide, cold brine, or a conventional evaporated refrigerant such as ammonia, sulfur dioxide, or Freon.

The airborne frozen coarse particles then flow continuously in an unbonded discrete condition through a conduit 23 into a grinder 25 which may be of any conventional construction such as a roll mill, fluid energy mill, or hammer mill, wherein the brittle frozen particles and included ice are disintegrated to an extremely fine condition. Ice crystals assist in abrading the particles.

After pulverization the airborne cold pulverized particles and accompanying ice particles pass through a conduit 27 to precooler 13 to precool the incoming airborne feed. From precooler 13 the airborne pulverized particles pass by a conduit 29 into a vacuum dehydrator 31 wherein a high vacuum is maintained to cause the ice crystals to sublime and pass off from the pulverized solid product particles, which then are removed in a dehydrated condition through an outlet 33.

In the modification shown in Fig. 2, coarse particles containing moisture are passed through a conduit 41 into a slurry tank 43 which is supplied with liquid pentane through a conduit 45, so that a slurry containing 35–65%, and preferably about 50%, solids by weight is formed. The slurry from tank 43 is pumped continuously by a pump 47 into a precooler 49 wherein its temperature is lowered to a point above freezing, such as 10° C., after which it passes through a conduit 51 into freezer 53 supplied with a coolant by a refrigerant system 55 of conventional design.

In freezer 53 the temperature of the slurry is lowered to a point such as —30° C. so that the water in the solid particles is frozen to ice while the pentane remains liquid to carry the frozen particles through a conduit 57 into a conventional grinder 59 wherein they are pulverized as described in connection with Fig. 1. The resulting cold mixture of pulverized solid particles and accompanying ice particles suspended in cold liquid pentane flows through a conduit 61 containing a pump 60 to the precooler 49 to lower the temperature of the incoming slurry.

From the precooler the slurry then passes by a conduit 63 into a suitable separator 65 which removes most of the liquid pentane from the solid ice and other particles. Cold pentane is then returned by a conduit 66 to slurry tank 43. Separator 65 may be a conventional filter, centrifuge, or the like.

The solid particles are then transferred by a conduit 67 to a vacuum dehydrator 69 such as described in connection with Fig. 1, wherein water is removed together with any remaining pentane, after which the dry pulverized solid product is removed through an outlet 71.

An alternative procedure in operating the system of Fig. 2 is to close a valve 68 and open a second valve 70 so that the slurry flows into a filter or other liquid separator 72 wherein all or part of the liquid pentane is separated from the solids which then pass to freezer 53 through conduit 73. The separated liquid pentane flows through a conduit 74 to the discharge line 61 from grinder 59, where it mixes with the discharge to form a cold slurry flowing as described previously.

In the modification shown in Fig. 3 coarse particles (say ¼–½ inch average diameter) of a dry, soft, resilient bibulous substance such as sponge rubber are introduced into a body of water in a tank 75 wherein they absorb a substantial quantity of water. The water soaked particles are then removed from tank 75, passed through a precooler 77, and into a freezer 79 wherein their temperature is reduced by a conventional coolant to freeze the absorbed water and embrittle the rubber, as described in connection with Figs. 1 and 2.

From the freezer the coarse particles are passed into a conventional grinder 81 and pulverized to a fine condition. The resulting cold pulverized product is passed by way of a conduit 82 into the precooler 77 and thence to a water separator 87 which may be as described in connection with Figs. 1 and 2, or may be constructed as a device which melts ice and thereafter separates the water from the solid particles by filtration, centrifuging, decantation or the like. Cold water from the separator 87 flows back to tank 85 as makeup through a line 88.

An alternative procedure in operating the system of Fig. 3 is to close a valve or gate 89 and open a second valve or gate 91 so that the water soaked lumps pass to a filter or other water separator 93 wherein excess water is separated from the solids which then pass into precooler 77 through a conduit 95. The separated water flows through a conduit 97 to the discharge line 82 from grinder 81 where it mixes with the cold discharge and is cooled itself to a low temperature.

When a bibulous material is pulverized as described in connection with Fig. 3 the water-soaked coarse particles may be conveyed through the system in any suitable way, as on conveyor belts, or by means of a gas or a water-immiscible liquid of low freezing point such as pentane as described in connection with Figs. 1 and 2.

Among the important advantages provided by the method described above are the economy of operation which results from the transfer of heat from incoming coarse solid particles to outgoing cold pulverized particles. Also, the operation is rapid and continuous. Still other important advantages are that when the solid particles are suspended in a water-immiscible liquid, such as pentane, heat transfer to the coolant is highly efficient, and coherence of frozen particles together and adherence of particles to the walls are prevented. Another important advantage is that substances which would be damaged if dehydrated by the application of heat, may be produced undamaged in the dehydrated pulverized condition.

Obviously, many modifications and variations of the invention, as hereinbefore set forth, may be made without departing from the spirit and scope thereof, and therefore only such limitations should be imposed as are indicated in the appended claims.

I claim:

1. A method for preparing fine particles from much coarser particles of a substance impregnated with a liquid material characterized by the ability to freeze to a solid material, said method comprising freezing said liquid material to a solid, thereafter pulverizing said substance to form fine particles at a low temperature, and passing said fine particles in heat exchange relationship with said coarse particles ahead of said freezing step to precool said coarse particles.

2. A method in accordance with claim 1, also comprising separating said material from said fine particles.

3. A method in accordance with claim 2, wherein said material is separated by subjecting said particles to a vacuum.

4. A method in accordance with claim 2, wherein said material is separated by melting said solid material back to liquid, and then removing said liquid from said particles.

5. A method in accordance with claim 1, wherein excess liquid accompanies said coarser particles, said method also comprising the step of separating at least part of said excess liquid ahead of said freezing step, and passing separated liquid to the discharge of said pulverizing step.

6. A method for preparing fine particles from much coarser particles of a substance impregnated with a liquid material characterized by the ability to freeze to a solid, said method comprising suspending relatively coarse particles of said substance in a flowing stream of a gas, freezing said liquid material to a solid material while suspended in said gas, thereafter pulverizing said substance to form fine particles at a low temperature and passing said fine particles in suspension in said gas from the zone of pulverization into heat exchange relationship with said coarse particles ahead of said freezing step to precool said coarse particles.

7. A method in accordance with claim 6, also comprising separating said material from said fine particles.

8. A method in accordance with claim 1 wherein said liquid material is frozen by passing in heat exchange relationship with said particles a fluid at a temperature well below the freezing point of said liquid material, and subsequently passing said fluid in heat exchange relationship with said particles ahead of said freezing step for precooling said particles.

9. A method for preparing fine particles from coarse particles of a substance impregnated with a first liquid material characterized by the ability to freeze to a solid material, said method comprising forming a slurry by suspending said coarse particles in a second liquid immiscible with said first liquid material and characterized by having a freezing point lower than said first liquid material, cooling said slurry to a temperature below the freezing point of said first liquid material to freeze said first liquid material, thereafter pulverizing said substance in the presence of said second liquid to form a slurry of pulverized particles in said second liquid, then passing said last-named slurry in heat exchange relationship with said first-named slurry ahead of said cooling step to precool said first-named slurry, and then separating said second liquid and said first material from said pulverized substance.

10. Pulverizing apparatus comprising, in combination, a precooler; a freezer connected to said precooler for receiving coarse particles to be frozen; a grinder connected to said freezer for receiving frozen particles to be ground; means connecting said grinder to said precooler for conveying cold ground particles in heat exchange relationship with coarse particles in said precooler; and drying means connected to said precooler for receiving and dehydrating said cold ground particles.

11. Apparatus in accordance with claim 10, also comprising means connecting said freezer with said precooler for conveying spent refrigerant to said precooler.

12. Apparatus in accordance with claim 10, wherein said means for dehydrating is a vacuum drier.

13. Apparatus in accordance with claim 10, also comprising slurry means for forming a slurry of coarse particles in a liquid to be passed through said precooler, freezer, and grinder; and a separator connected between said precooler and said drying means for separating said liquid from the ground particles before dehydration thereof.

14. Apparatus in accordance with claim 13, also comprising means connecting said separator with said slurry means to return separated liquid thereto.

15. Apparatus in accordance with claim 10, also comprising means for impregnating coarse particles with a liquid to be frozen, said last-named means being connected to said precooler.

References Cited in the file of this patent

UNITED STATES PATENTS

| | | |
|---|---|---|
| 226,057 | Gerner | Mar. 30, 1880 |
| 953,946 | Pinkler | Apr. 5, 1910 |
| 2,347,464 | Cono | Apr. 25, 1944 |
| 2,418,746 | Bartlett et al. | Apr. 8, 1947 |
| 2,467,318 | Kellogg | Apr. 12, 1949 |
| 2,550,615 | Stansbury | Apr. 24, 1951 |
| 2,583,697 | Hendry et al. | Jan. 29, 1952 |
| 2,609,150 | Bludau | Sept. 2, 1952 |